US007225001B1

(12) United States Patent
Eriksson et al.

(10) Patent No.: US 7,225,001 B1
(45) Date of Patent: May 29, 2007

(54) SYSTEM AND METHOD FOR DISTRIBUTED NOISE SUPPRESSION

(75) Inventors: Anders Eriksson, Uppsala (SE); Erik Ekudden, Akersberga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/556,579

(22) Filed: Apr. 24, 2000

(51) Int. Cl.
*H04M 1/00* (2006.01)

(52) U.S. Cl. .................................... 455/570; 375/254

(58) Field of Classification Search ............ 455/67.13, 455/67.11, 90.1, 90.2, 90.3, 2.2, 570, 218, 455/221, 222, 253, 296, 501, 63.1, 114, 213, 455/135, 283; 375/227, 254, 346
See application file for complete search history.

(56) References Cited

U.S. PATENT DOCUMENTS

| | | | | |
|---|---|---|---|---|
| 3,560,669 | A * | 2/1971 | Foulkes | 179/170.6 |
| 3,665,345 | A * | 5/1972 | Dolby | 333/14 |
| 5,680,393 | A | 10/1997 | Bourmeyster et al. | 370/286 |
| 5,839,101 | A | 11/1998 | Vähätalo et al. | 704/226 |
| 5,903,819 | A | 5/1999 | Romesburg | 455/63 |
| 5,933,506 | A * | 8/1999 | Aoki et al. | 381/51 |
| 5,943,429 | A | 8/1999 | Händel | 381/94.2 |
| 6,075,783 | A * | 6/2000 | Voit | 370/352 |
| 6,081,732 | A * | 6/2000 | Suvanen et al. | 455/570 |
| 6,115,589 | A * | 9/2000 | Ferrer et al. | 455/249.1 |

FOREIGN PATENT DOCUMENTS

| | | | |
|---|---|---|---|
| EP | 0 655 731 A2 | | 5/1995 |
| EP | 0 899 718 A2 | | 3/1999 |
| JP | 655731 | * | 5/1995 |
| WO | WO 97/34290 | * | 9/1997 |

OTHER PUBLICATIONS

Nathalie Virag; Single *Channel Speech Enhancement Based on Masking Properties of the Human Auditory System*; IEEE Transactions on Speech and Audio Processing, vol. 7, No. 2; Mar. 1999; pp. 126-127 and 134-137.

Jae S. Lim and Alan V. Oppenheim; *Enhancement and Bandwidth Compression of Noisy Speech*; IEEE Proceedings of the IEEE, vol. 67, No. 12; Dec. 1979; pp. 1586-1604.

Steven F. Boli; Suppresion of Acoustic Noise in Speech Using Spectral Substraction; IEEE Transactions on Acoustics, Speech, and Signal Processing, vol. ASSP-27, No. 2; Apr. 1979; pp. 113-120.

ISR for PCT/EP/01/00862, Completed Jul. 9, 2001.

* cited by examiner

*Primary Examiner*—Edward F. Urban
*Assistant Examiner*—Tu X. Nguyen

(57) ABSTRACT

The present invention advantageously provides a manner by which to further suppress noise superimposed upon an information signal without increasing distortion to the signal, e.g., speech. By distributing the noise suppression, the quality of the information signal provided to a listener is improved. In one embodiment, a first noise suppressor is employed at the transmitter to suppress noise superimposed upon an information signal prior to its transmission by the transmitter, and a second noise suppressor is employed at the receiver to suppress the noise component of a communication signal received at the receiver.

6 Claims, 5 Drawing Sheets

SYSTEM AND METHOD FOR DISTRIBUTED NOISE SUPPRESSION

BACKGROUND OF THE INVENTION

1. Technical Field of the Invention

The present invention is directed to improvements in noise suppression in telephony systems, particularly, to a system and method for distributed noise suppression.

2. Description of the Related Art

A communication system is comprised, at a minimum, of a transmitter and a receiver interconnected by a communication channel. Communication signals formed at, or applied to, the transmitter are converted at the transmitter into a form to permit their transmission upon the communication channel. The receiver is tuned to the communication channel to receive the communication signals transmitted thereupon. Once received, the receiver converts, or otherwise recreates, the communication signal transmitted by the transmitter.

A radio communication system is a type of communication system in which the communication channel comprises a radio frequency channel formed of a portion of the electromagnetic frequency spectrum. A radio communication system is advantageous in that the transmitter and receiver need not be interconnected by way of wireline connections. As, instead, the communication channel is formed of a radio frequency channel, communication signals can be transmitted between the transmitter and the receiver even when wireline connections therebetween would be inconvenient or impractical.

The quality of communications in a communication system is dependent, in part, upon levels of noise superimposed upon the information signal transmitted by the transmitter to the receiver. Noise can be introduced upon the informational signal at the transmitting side of the communication channel, e.g., acoustical background noise at the transmitting side. Noise can also be introduced upon the informational signal while being transmitted upon the communication channel, e.g., distortion introduced by speech coding and possibly also errors in the transmission channel.

When the noise level of the signal provided to a listener positioned at the receiver is high relative to the informational signal, the audio quality of the signal provided to the listener is low. If the noise levels are too significant, the listener is unable to adequately understand the informational signal provided at the receiver. Noise can be either periodic or aperiodic in nature. Random noise and white noise are exemplary of aperiodic noise. While a human listener is generally able to fairly successfully "block out" aperiodic noise from an informational signal, periodic noise is sometimes more distracting to the listener.

Various manners by which to remove noise components superimposed upon an informational signal, or at least to improve the ratio of the level of the informational signal to the level of the noise, are sometimes utilized. For instance, filter circuits are sometimes used which filter or otherwise remove the noise components from a communication signal, both prior to transmission by a transmitter and also subsequent to reception at a receiver.

Conventional filter circuits include circuitry for filtering noise components superimposed upon an informational signal. A spectral subtraction process is performed during operation of some of such conventional filter circuits. The spectral subtraction process is performed, e.g., by execution of an appropriate algorithm by processor circuitry. While a spectral subtraction process is sometimes effective to reduce noise levels, a spectral subtraction process also introduces distortion upon the informational signal. In some instances, the distortion introduced upon the informational signal is so significant that the utility of such a process is significantly limited. A spectral subtraction process is inherently a frequency-domain process and therefore necessitates a potentially significant signal delay when converting a time domain signal received by circuitry utilizing such a process into the frequency domain. Also, because such a process typically utilizes fast Fourier transform techniques, the resolution permitted of practical circuitry which performs such a process is typically relatively low.

When the ratio of the level of the information signal is high relative to the level of the noise, such noise suppression process, in spite of these problems, is typically fairly successful. However, when the ratio is high, there is also less of a need to perform noise suppression. Such a spectral subtraction process is therefore sometimes of a limited utility to significantly improve the quality of communications.

A radiotelephonic communication system is exemplary of a wireless communication system in which noise superimposed upon an informational signal affects the quality of communications transmitted during operation of the communication system. Noise can be superimposed upon the informational signal at any stage during the transmission and reception process including noise superimposed upon an informational signal prior to tis application to the transmitter. Such noise can deleteriously affect the quality of communications.

In particular, perceived speech quality of a signal containing background noise depends mainly on two factors: the level of the noise and any artifacts in the speech or noise.

A signal with less noise is generally considered more desired than a signal with a higher noise level and a noise suppression algorithm exploits this. When designing a noise suppression algorithm the overall perceived speech quality is, of course, optimized.

Separating the contributions of the noise level and speech impairments to the overall perceived speech quality, it has been shown that the noise level (in dB) has a fairly linear correspondence to the perceived quality, as generally depicted in FIG. 1 of the Drawings. Similarly, it can be shown that a noise suppression algorithm usually has a non-linear relation between the amount of noise suppression and the perceived speech quality due to impairments in the speech, as generally illustrated in FIG. 2. Hence, there is an optimum point for which the perceived speech quality may be maximized, as depicted in FIG. 3, which describes the sum of the two contributions to the speech quality described in FIGS. 2 and 3.

A fundamental problem in finding this optimum point is that although the general behavior depicted in FIGS. 1 and 2 holds for many noise types and users of the telephone system, the relative importance of the two contributions can vary substantially between different noise types and different users.

Particularly, designing for a very high noise power level reduction, the noise suppression algorithm will also affect the speech signal to a large extent, and this may cause an objectionable reduction of the perceived speech quality. Hence, if no, or only very minor, impact on the speech signal is desired, the noise suppression algorithm has to be tuned for a low amount of noise suppression.

There is, therefore, a need for improvement in noise suppression technology, particularly in view of the growing interconnectivity and ubiquity of telephonic devices in the world, where improvements in noise suppression algorithms and methodologies will facilitate further market penetration and increase customer quality perceptions.

It is in light of this background information on noise suppression algorithms and circuitry that the significant improvements of the present invention have evolved.

SUMMARY OF THE INVENTION

The present invention advantageously provides a manner by which to further suppress noise superimposed upon an information signal without increasing distortion to the signal, e.g., speech. By distributing the noise suppression, the quality of the information signal provided to a listener is improved without the deleterious effects of distortion.

In one embodiment, a first noise suppressor is employed at the transmitter to suppress noise, e.g., acoustic noise, superimposed upon an information signal prior to its transmission by the transmitter, and a second noise suppressor is employed at the receiver to suppress the noise component of a communication signal received at the receiver.

BRIEF DESCRIPTION OF THE DRAWINGS

A more complete understanding of the various methods and arrangements of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS OF THE INVENTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
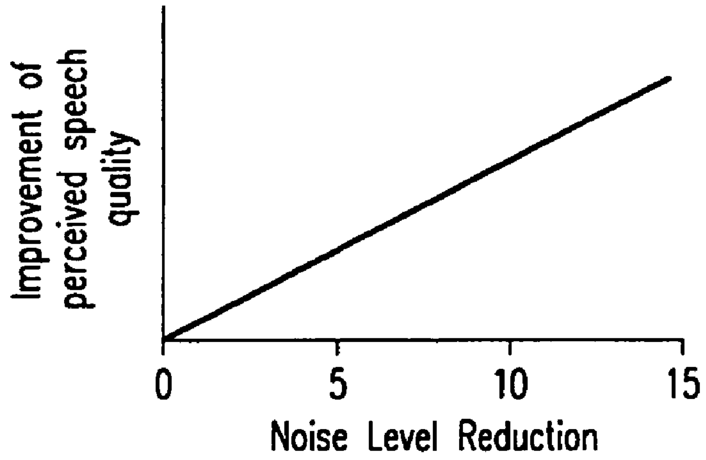
FIG. 1 (PRIOR ART)
FIG. 1 is a graph illustrating the substantially linear relationship between improvement of perceived speech quality and noise level reduction.

As discussed in connection with FIGS. 1–3, noise suppression has a cost, i.e., speech distortion, and if further gains in clarity are desired, speech distortion is increased. Optimization of this trade-off is at the heart of the present invention.

A possibility to obtain a large amount of noise suppression while not severely impacting the speech is to apply a low level noise suppression twice in the system. From FIG. 1 it is clear that applying a noise suppression of ×dB twice yields the same improvement as applying a noise suppression of 2×dB only once. On the other hand, from FIG. 2 it is clear that by applying a noise suppression of ×dB twice, less speech quality impairment is introduced than applying a noise suppression of 2×dB. Hence, with this approach of twice applying a low level noise suppression a better overall perceived speech quality can be obtained.

In general, this would however not significantly reduce the speech quality impairments introduced by the noise suppressors, since the noise suppression in essence is a linear operation. It should be understood that merely feeding the output of one noise suppression algorithm directly as the input to a second noise suppressor would be the same as running the first noise suppression with twice the amount of noise suppression. Hence, for the second noise suppressor, the corresponding FIG. 2 will have a different appearance than for the first noise suppression algorithm, due to that the noise in the two signals are different, i.e., the noise in the signal to a first noise suppressor, e.g., at the transmitter side, is an ordinary acoustic background noise, while the noise in the signal to a second noise suppressor at the receiver side has been noise suppressed and has a slightly different characteristic.

Figure 4:
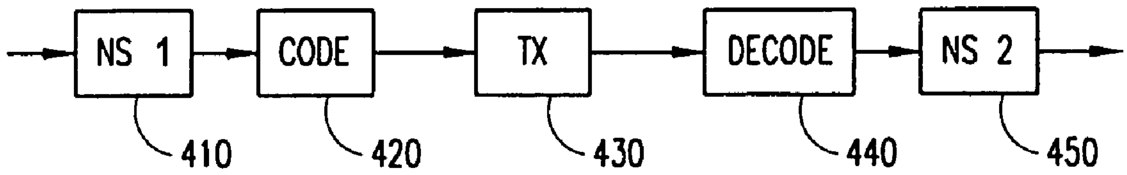
FIG. 4 illustrates noise suppression in a communications system pursuant to the teachings of the present invention, particularly, a system employing low bit rate speech encoding.

In a system containing a low bit rate speech codec, however, this approach can be exploited. With reference now to the positioning of the noise suppression algorithms illustrated in FIG. 4, it is seen that the output from the aforementioned first noise suppressor (NS1), designated in the figure by the reference numeral 410, is not directly fed as input to the second noise suppressor (NS2), designated by the reference numeral 450, but the speech coded signal is instead presented as input to the second noise suppressor 450.

Figure 2:
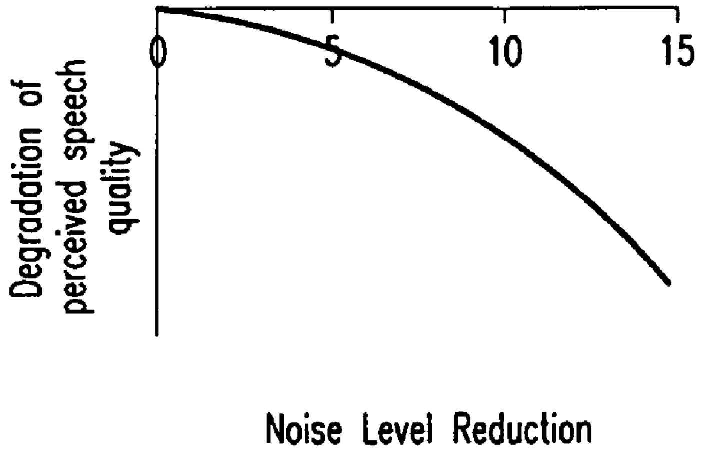
FIG. 2 (PRIOR ART)
FIG. 2 is a graph, on the other hand, illustrating the relationship between degradation of perceived speech quality and noise level reduction, particularly, noise power level reduction due to noise suppression interaction with the speech signal.
Figure 3:
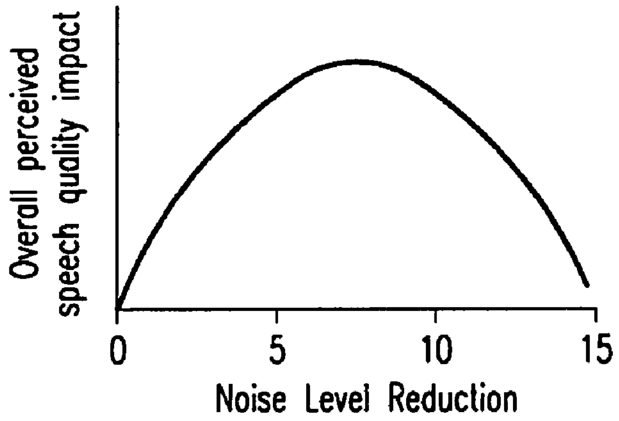
FIG. 3 (PRIOR ART)
FIG. 3 is a graph illustrating the overall impact on speech quality by a noise suppression algorithm.

It should be understood to one skilled in the art that the encoding of the speech signal, e.g., by an encoder 420, has a smoothing effect on the background noise, and the corresponding FIG. 2 for the second noise suppressor 450 will be similar to the behavior of noise suppressor 410. Hence, by incorporating a noise suppression algorithm in the speech encoder 420, and a second noise suppression in a corresponding, receiver-side speech decoder 440, and tuning these algorithms individually for optimizing the perceived speech quality, a larger mount of noise suppression can be achieved compared to including only one noise suppression algorithm to the system, e.g., only noise suppressor 410. As an example, the proposed approach with 8 dB noise suppression in the speech encoder and 6 dB noise suppression in the speech decoder gives better overall performance compared to including only one noise suppression algorithm with 14 dB noise reduction in the speech encoder.

In addition to the aforementioned reduction of acoustic background noise with less speech quality impairments, the noise suppressor in the decoder may be tuned to also suppress noise introduced by the transmission system, e.g., distortion caused by low bit-rate speech encoding. This can be performed within the framework of spectral subtraction Spectral subtraction or filter-based noise suppression algorithms can be generally described through the model $$x(n)=s(n)+v(n)$$

where s(n) is the desired speech, v(n) is the noise to be suppressed, and x(n) is the measured microphone signal.

The noise can either be acoustic background noise, $v_a(n)$ or a combination of acoustic background noise and noise added during the transmission, $v_c(n)$, e.g., coding distortion, i.e., $v(n)=v_a(n)+v_c(n)$. The speech is enhanced by applying a filter (described through its frequency domain representation, $H(\omega)$) to the measured signal, $x(n)$. The filter $H(\omega)$ can be seen as computed from a model $$H(\omega)=\left(1-\delta\left(\omega,\hat{\Phi}_{v_a},\hat{\Phi}_{v_c},\hat{\Phi}_x\right)\left(\frac{\hat{\Phi}_v(\omega)}{\hat{\Phi}_x(\omega)}\right)^{\alpha}\right)^{\beta}$$

where $\alpha$, $\beta$, and $\delta(\omega, \hat{\Phi}_{v_a}, \hat{\Phi}_{v_c}, \hat{\Phi}_x)$ are constants determining the exact variation of the noise suppressor, $\hat{\Phi}_v(\omega)=\hat{\Phi}_{v_a}(\omega)+\Phi_{v_c}(\omega)$ and $\hat{\Phi}_x(\omega)$ are estimates of the power spectral density of the pure noise and noisy speech, respectively.

A further improvement in performance of the basic preprocessing noise suppressor can be achieved by adjusting the amount of noise suppression and other characteristics of the noise suppressor (such as averaging and design of the noise suppressing filter, or equivalently) as a function of the noise characteristics, mainly the level of the noise and the spectral characteristics of the noise. For a low level stationary noise, the noise suppressors can be set to give a slightly lower noise reduction, in order to optimise the subjective performance. Furthermore, for a background noise with a large spectral variation, some of the negative effects of the noise suppressor on the speech quality can be masked by the noise variations, and a slightly higher noise reduction can be tolerated.

With the proposed approach of sub-dividing the noise suppression into two modules, the aforementioned adaptation of the noise suppressors can be further optimized for a given speech encoding/decoding system by separately adapting the noise suppression for the pre- and post-NS as a function of noise level and noise spectral characteristics as well as the characteristics of the speech encoding/decoding system. Particularly, for a speech encoding/decoding system operating on a relatively low bit rate, a larger amount of noise reduction of the post-NS can be tolerated compared to the case of a speech encoding/decoding system operating on a higher bit rate.

As an example, for the ETSI Adaptive Multi-Rate (AMR) speech coding system the following noise suppression levels can be considered for a stationary noise:

| AMR bit rate | Pre NS level (dB) | Post NS level (dB) |
|---|---|---|
| 4.75 | 10 | 6 |
| 5.15 | 10 | 6 |
| 5.9 | 10 | 6 |
| 6.7 | 10 | 4 |
| 7.4 | 8 | 4 |
| 7.95 | 8 | 4 |
| 10.2 | 8 | 2 |
| 12.2 | 8 | 2 |

Preferably, the Noise Suppression algorithms implemented in the system should exhibit a short algorithmic delay in order to reduce the increase in transmission delay of the complete system. In a preferred implementation of the distributed noise suppression improvements of the present invention, Applicant has found that the first or pre-noise suppression technique produces noise reductions in a range of about 6 to 14 db, more preferably, about 8–10 db, and most preferably at about 8 dB. Similarly, the second or post noise suppression further reduces noise in a range of about 1–10 dB, more preferably about 2 to 8 db, and most preferably, about 5 or 6 dB more reduction.

Figure 5:
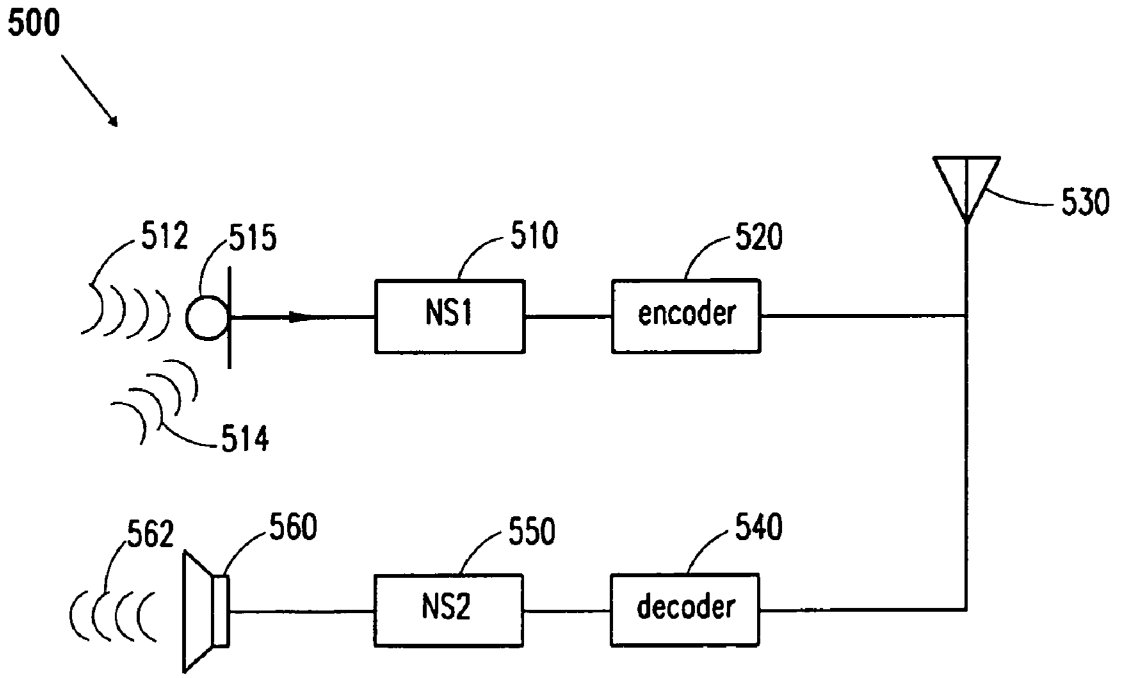
FIG. 5 illustrates in more detail the noise reduction components within a radiotelephone pursuant to the principles of the present invention.

With reference now to FIG. 5, there is illustrated a mobile telephone, generally designated by the reference numeral 500, which includes a noise suppressor 510 as a portion thereof. An operator of the mobile telephone or terminal 500 generates acoustic information signals, generally designated by the reference numeral 512, and ambient or environmental noise signals, generally designated by the reference numeral 514, also enter the microphone 515 and are superimposed upon the acoustic or speech information signals 512.

The microphone 515 converts the received signal formed of signal 512 and the accompanying noise 514 into electrical form and processed, such as described in more detail in U.S. Pat. No. 5,903,819, prior to encoding by an encoder 520. The encoded, noise-suppressed signal is then passed to a transmitter antenna 530.

The mobile terminal 500 preferably further includes noise suppression at the receiver end in order to receive the aforementioned noise-suppressed signals produced by other mobile terminals or other telephonic devices. For example, after a decoder 540 decodes an encoded noise-suppressed received signal, a second noise suppressor 550 removes the noise components of the signal received at the transmitter antenna 530. The signal from the noise suppressor 550 is then passed to a speaker 560, which emits a doubly noise suppressed signal 562.

Figure 6:
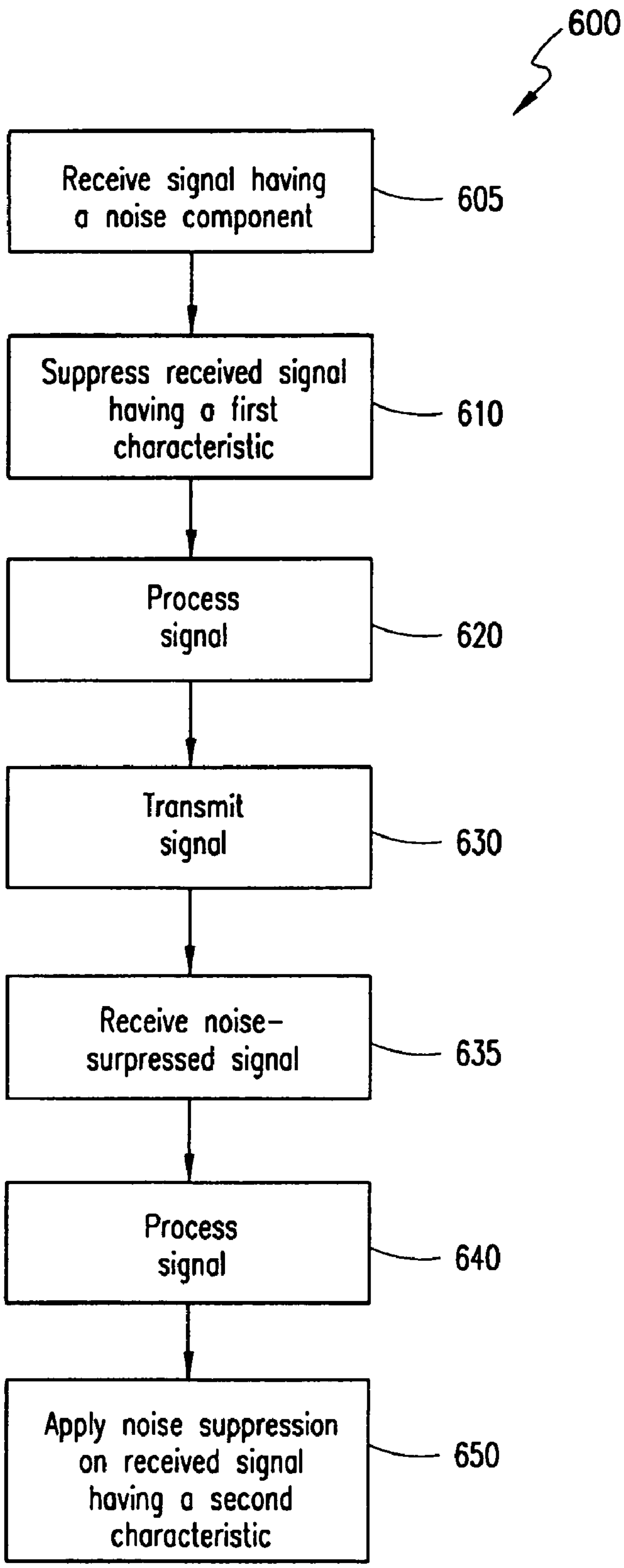
FIG. 6 illustrates a methodology for implementation of the distributed noise reduction principles of the present invention.

With reference now to FIG. 6, there is illustrated a methodology, generally designated by the reference numeral 600, of an embodiment of the present invention. As shown in FIG. 6, after receipt of an information signal (step 605) having a noise component, e.g., signal 512 and noise 514 received by the microphone 515 in FIG. 5, the noisy signal is passed to a first noise suppressor (step 610) which is optimized to suppress acoustic noise. As shown in FIG. 6, control is then passed to step 620 in which the noise-suppressed signal is processed, e.g., encoded, prior to transmission (step 630).

At the receiver end of the transmission, another user receives the noise-suppressed signal (step 635), processes (step 640), e.g., decodes, the signal, and passes control to step 650, in which a second noise suppressor is applied to the received signal and optimized to filter out noise in the received signal format. The distributed, doubly noise reduced signal is then played to the receiving user. It should be understood that the passed signal of step 650 need not pass directly to a user, but may, instead, be passed, e.g., via the Internet, PSTN or other network to the ultimate recipient.

Figure 7:
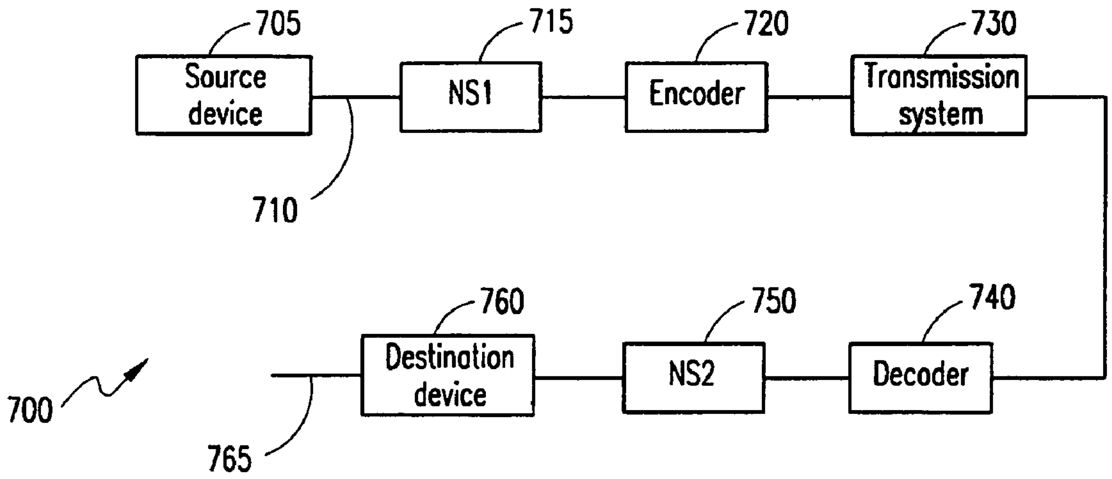
FIG. 7 also illustrates noise suppression in a communications system, particularly, a system for encoding and decoding voice communications.

With reference now to FIG. 7 of the Drawings, there is illustrated a further embodiment of the present invention, better illustrating the scope of the subject matter of the present invention and better exemplifying additional embodiments for implementing the distributed noise suppression techniques of the claimed invention. In particular, a system, generally designated by the reference numeral 700, has a source or first device 705, e.g., a microphone, terminal, PC, Internet device or a transmission system (wired or wireless) with voice communication channels, which are subject to an environmental noise component.

The signal sent over a voice (or data) communication channel 710 to a first noise reduction, preferably geared or algorithmically tuned to reducing the particular types of noise generated at the source device 705 and promulgated and propagated to the first noise suppressor 715. The noise-reduced signal from the first noise suppressor 715 is then encoded by an encoder 720 and transmitted in coded format over a transmission system 730, e.g., a wireless system, a wireline system across the PSTN, an Internet communication or other coded transmission.

Upon reception, a decoder 740 decodes the received signal, which has already been noise suppressed once, and forwards the signal to a second noise suppressor 750. As noted hereinbefore, the environmental noise being suppressed by the second or post noise suppressor 750 is most likely different from that noise at the first noise suppressor 710. For example, acoustic noise may be reduced at the first noise suppressor 710 and encoding or other transmission noise may be handled at the second noise suppressor 750. As with the first, the second noise suppressor 750 is preferably tuned to the particular noises likely to be generated upon encoding and transmission, and the algorithms employed to suppress the post noise are different from the pre algorithms, differences which are well understood in this art, e.g., pursuant to noise type and characteristics.

The doubly noise suppressed signal from the second noise suppressor 750 is then transmitted to a destination device 760, e.g., a loudspeaker, terminal or other transmission system (wired or wireless) across a communication channel 765.

It should also be understood that the noise types and characteristics may change and the subject matter of the present invention is intended to encompass algorithmic modifications to handle dynamic shifts in noise types and characteristics to best handle the various noises present. Furthermore, the noise suppression techniques are preferably adaptable as a function of the particular transmission systems employed, e.g., various bit-rates of speech codec resulting in different level reductions.

The previous description is of preferred embodiments for implementing the invention, and the scope of the invention should not necessarily be limited by this description. The scope of the present invention is instead defined by the following claims.

What is claimed is:

1. In a telecommunications system having voice communications subject to noise, a distributed noise suppression system for suppressing the noise for a given one of the voice communications, said noise suppression system comprising:

a first noise suppressor, within a first device, giving a first amount of noise suppression level for suppressing noise in the first device prior to transmission of the noise-suppressed signal to a destination device prior to an encoding process, wherein the first noise suppressor is adapted to suppress acoustic background noise, said first noise suppressor including:

means for adjusting the level of noise suppression in direct relation to a measured amplitude of the acoustic background noise; and means for adjusting the level of noise suppression in direct relation to a measured spectral variation of the acoustic background noise; and a second noise suppressor, within the destination device, giving a second amount of noise suppression level for further suppressing the noise-suppressed signal received from the first device, and decoded in a decoding process, wherein the second noise suppressor is adapted to suppress noise due to encoding and decoding distortion and transmission noise, said second noise suppressor including means for adjusting the level of noise suppression in inverse relation to a bit rate utilized in the encoding and decoding processes;

whereby the noise associated with the given voice communication is reduced by an overall amount of noise suppression level.

2. The noise suppression system according to claim 1, wherein said destination device is selected from the group consisting of:

a loudspeaker, terminal, PC, Internet device, and a transmission system.

3. The noise suppression system according to claim 1, wherein said first and second noise suppressors employ respective algorithms therein tuned to the respective noises encountered.

4. The noise suppression system according to claim 3, wherein the first and second noise suppression algorithms adapt dynamically to the respective noises encountered.

5. In a telecommunications system having voice communications subject to noise, a mobile telephone having suppression means therein for suppressing the noise for a given one of the voice communications, said mobile telephone comprising:

a first noise suppressor for suppressing acoustic background noise received by a microphone, said first noise suppressor giving a first amount of noise suppression level prior to encoding and transmitting the noise-suppressed signal to a destination device, said first noise suppressor including:

means for adjusting the level of noise suppression in direct relation to a measured amplitude of the acoustic background noise; and means for adjusting the level of noise suppression in direct relation to a measured spectral variation of the acoustic background noise; and a second noise suppressor giving a second amount of noise suppression level for suppressing a received and decoded noise-suppressed signal received from a transmitting device having a first noise suppressor therein, wherein the second noise suppressor is adapted to suppress noise due to encoding and decoding distortion and transmission noise, said second noise suppressor including means for adjusting the level of noise suppression in inverse relation to a bit rate utilized in the encoding and decoding processes, whereby the noise associated with the received noise-suppressed signal is reduced by an overall amount of noise suppression level.

6. In a telecommunications system having voice communications subject to noise, a method for suppressing the noise for a given one of the voice communications, said method comprising:

noise suppressing, by a first noise suppressor giving a first amount of noise suppression level, acoustic noise received by a first device prior to encoding and transmitting the noise-suppressed signal to a destination device, said step of noise suppressing including:

adjusting the level of noise suppression in direct relation to a measured amplitude of the acoustic background noise; and adjusting the level of noise suppression in direct relation to a measured spectral variation of the acoustic background noise; and further noise suppressing, by a second noise suppressor giving a second amount of noise suppression level within the destination device, the noise-suppressed signal received from the first device, said step of further noise suppressing including:

suppressing noise due to encoding and decoding distortion and transmission noise; and adjusting the level of noise suppression in inverse relation to a bit rate utilized in the encoding and decoding processes.

* * * * *

UNITED STATES PATENT AND TRADEMARK OFFICE

CERTIFICATE OF CORRECTION

PATENT NO. : 7,225,001 B1
APPLICATION NO. : 09/556579
DATED : May 29, 2007
INVENTOR(S) : Eriksson et al.

It is certified that error appears in the above-identified patent and that said Letters Patent is hereby corrected as shown below:

In Column 2, Line 27, delete "tis" and insert -- its --, therefor.

In Column 4, Line 48, delete "mount" and insert -- amount --, therefor.

Signed and Sealed this

Eighth Day of April, 2008

JON W. DUDAS
*Director of the United States Patent and Trademark Office*